United States Patent [19]

Khosla

[11] Patent Number: 5,060,169

[45] Date of Patent: Oct. 22, 1991

[54] VIDEO SIMULATION OF AN AIRBRUSH SPRAY PATTERN

[75] Inventor: Ashok M. Khosla, Palo Alto, Calif.

[73] Assignee: Ampex Corporation, Redwood City, Calif.

[21] Appl. No.: 68,978

[22] Filed: Jul. 1, 1987

[51] Int. Cl.⁵ .............................................. G06F 15/62
[52] U.S. Cl. .................................................. 364/521
[58] Field of Search ............... 364/518, 521; 358/104; 340/701, 704, 706, 707, 709, 806

[56] References Cited

U.S. PATENT DOCUMENTS

| | | | |
|---|---|---|---|
| 4,345,313 | 8/1982 | Knox | 340/709 X |
| 4,514,818 | 4/1985 | Walker. | |
| 4,528,636 | 7/1985 | Robinson, III | 364/521 |
| 4,615,013 | 9/1986 | Yan et al. | 358/104 X |
| 4,677,576 | 6/1987 | Berlin, Jr. et al. | 340/723 X |
| 4,692,880 | 9/1987 | Merz et al. | 364/521 |
| 4,695,966 | 9/1987 | Takakura et al. | 364/521 |

FOREIGN PATENT DOCUMENTS 2157121 1/1983 United Kingdom .

OTHER PUBLICATIONS

Lewis, "Texture Synthesis for Digital Painting", *Computer Graphics*, vol. 18, No. 3, pp. 245-251, Jul. 1984.

Primary Examiner—Dale M. Shaw
Assistant Examiner—Mark K. Zimmerman
Attorney, Agent, or Firm—James A. LaBarre; George B. Almeida; John R. Lastova

[57] ABSTRACT

To produce a simulated airbrush spray pattern comprising a random pattern of pixels in a video image, multiple source arrays defining random variations of one or more video image parameters are created. Each time that an airbrush spray pattern is to be generated on a video display, the source arrays are individually retrieved and used to control the characteristics of corresponding pixels in the video image. The arrays are varied on a regular basis to create a random pattern in the image that simulates the effects of an airbrush spray. Various modifications can be used to create particular effects and position dependent textures, such as the short, random streaks that are produced by chalk.

38 Claims, 2 Drawing Sheets

FIG. 4
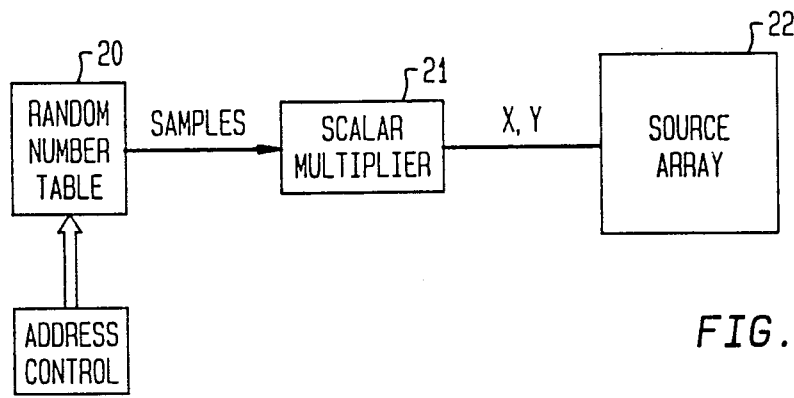
FIG. 5
FIG. 6
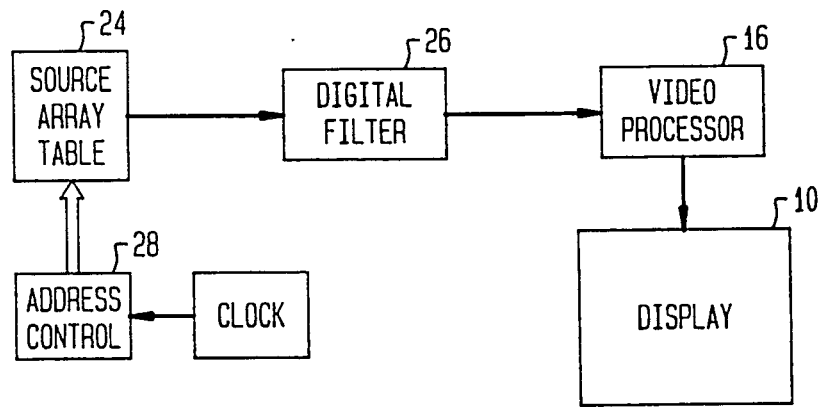
FIG. 7

VIDEO SIMULATION OF AN AIRBRUSH SPRAY PATTERN

BACKGROUND OF THE INVENTION

The present invention is directed to the field of video graphics, and is particularly concerned with the simulation of random patterns in a video display, such as the spray pattern produced by a manually controlled artist's airbrush.

In the field of video graphics, various painting capabilities are available which enable a user to simulate the application of a brushstroke of paint on a video display. Typically, the user might select the color of the paint and the width of the brushstroke through appropriate entries on a computer keyboard. Then, through the movement of a pen across a tablet or the movement of a mouse across a surface, the user directs where the brushstroke is to appear in an image displayed on a video monitor. The computer detects the relative positions of the pen and the tablet, or the movement of the mouse, and causes a display of the appropriate color and width to appear at that portion of the video screen corresponding to the detected location.

The simulation of a brushstroke on a video screen is a relatively straightforward matter since the concentration of "paint" is similar along the length of the brushstroke. Every picture element (pixel) of the video image in the path of the brush is actuated to produce a display of the selected color. One limitation associated with video painting programs is that the resulting display often lacks the feeling of texture. This limitation is due to the fact that all of the colors are applied in similar concentrations. To alleviate this situation, it is desirable to produce different concentrations of paint in a video display, for example to provide a greater feeling of texture in the resulting picture In particular, it is desirable to simulate the spray pattern of randomly mixed paint and air generated by an airbrush of the type that is used for photographic editing and in the graphic arts.

To simulate the effects of a paint brush in a video system, a raster mask is created to define the paint pattern produced by the brush. Basically, the raster mask defines a group of pixels related to the shape of the brush. The mask has multiple cells or locations, each of which corresponds to a pixel in the defined group. Each cell contains one or more values which determine the display characteristics, e.g., color, of the corresponding pixels. These display characteristics are reproduced along the length of the brush stroke to generate the video image.

In the past, attempts at simulating the effect of an airbrush have employed a raster mask defining a circular group of pixels with a graded alpha parameter. The alpha parameter is a control or key signal used in video graphics to determine the transparency of an image by attenuating the color tristimulus (i.e., red, green and blue) components of the image. To simulate an airbrush, the cells at the center of the mask are provided with an alpha value of 1.0, and the alpha value decreases in a direction away from the center so that the cells on the periphery of the mask have a value at or near zero. Accordingly, the concentration of paint is most dense in the center of the spray pattern and gradually decreases to provide a smooth blend to zero at the edges of the pattern.

Although this approach provides a better transition between colors than solid concentration brushstrokes, it is still not truly representative of the spray pattern that is generated by a typical airbrush More particularly, if the spray pattern generated with this varying alpha mask is repeated at each incremental position along the length of the brushstroke, it creates a distinct stripe which is darkest at the center and fades towards its edges. In contrast, the actual spray pattern produced by an airbrush is more random in nature, and thus does not produce such a noticeable stripe when the airbrush is swept across a piece of paper or the like. Accordingly, it is desirable to provide a video simulation of an airbrush spray in which the spray pattern is randomly varied along the brushstroke, to thereby produce a more realistic simulation of texture in a videographic display.

BRIEF STATEMENT OF THE INVENTION

To produce a video airbrush pattern in accordance with the present invention, multiple source arrays, or raster masks, are created. Each source array defines a spray distribution that is produced by the simulated airbrush at an instant in time. These source arrays are individually retrieved from a memory, or generated on a real time basis, at an appropriate rate and control the content of the video image at respective locations corresponding to the instantaneous positions of the airbrush, to create a destination, or displayed, pattern. The source array is varied over time, e.g., a different source array can be incorporated into the display at every predefined increment of time, so that the displayed pattern varies on a random basis over the length of the brushstroke. Thus, the simulated airbrush pattern more realistically reproduces the effects obtained with an actual airbrush. Alternatively, the source array can be varied on a less frequent basis to produce other desired effects, such as the streaking which is characteristic of chalk lines.

Each source array comprises a set of values which define a randomly varying parameter in the displayed pattern. Each row of the array corresponds to a scan line in a video image. To generate the source array, a random number table can be created using a desired probability distribution function. The table is repeatedly addressed and the number that is retrieved from each addressed location comprises a sample that determines the value of the parameter at a particular location in the array. For example, the parameter could be the color of a pixel, its alpha value, or the coordinate location of a pixel which is to be actuated in the image.

Once the total number of samples have been generated to produce a source array, the number of samples having a particular value in each row of the array can be counted and stored in a buffer. Each time that a source pattern is to be reproduced on a video display as a pen is moved across a tablet, for example, the number stored in the buffer for a particular scan line determines a number of samples to be retrieved from the random number table. These retrieved samples can determine the particular pixels that are to be actuated in the corresponding scan line in the displayed pattern. When the source array is to be varied, a new set of samples can be retrieved in accordance with the numbers stored in the buffer. To provide greater variety, a different buffer having a different set of numbers might be employed.

This approach facilitates variation in the characteristics of the displayed pattern. For example, to simulate a spray pattern of lower paint concentration, i.e., more air in the spray, the number of samples can be reduced for a raster mask of a given size. Similarly, to change the size of the spray pattern, the number of samples and the total number of pixels in the displayed pattern can be varied together. Other variations of this approach, for example by modifying the manner in which the random number table is addressed, can be used to create various desired effects.

Further detailed features of the invention and the manners in which it can accommodate the production of particular desired effects are explained in greater detail hereinafter with reference to preferred embodiments illustrated in the accompanying drawings.

BRIEF DESCRIPTION OF THE DRAWINGS

FIG. 4 is a functional block diagram illustrating the generation of a source array;

FIG. 5 is an example of a 5×5 random source array;

FIG. 6 is a functional block diagram illustrating the generation of a display pattern from a source array; and FIG. 7 is a block diagram illustrating a further embodiment of the invention utilizing a row counter.

DESCRIPTION OF THE ILLUSTRATED EMBODIMENTS

To facilitate an understanding of the features of the invention and the advantages offered thereby, the invention will be described hereinafter with particular reference to the production of a spray pattern of a single color. Thus, if a pixel is defined as being "on" or "actuated" it is meant that the pixel produces a display of the desired color. It will be appreciated by those of ordinary skill in the art, however, that the practical applications of the invention are not limited to such a specific embodiment. For example, multiple colors might be generated in the pattern if desired, and parameters other than color or actuation of a pixel can be controlled to produce certain effects.

Figure 1:
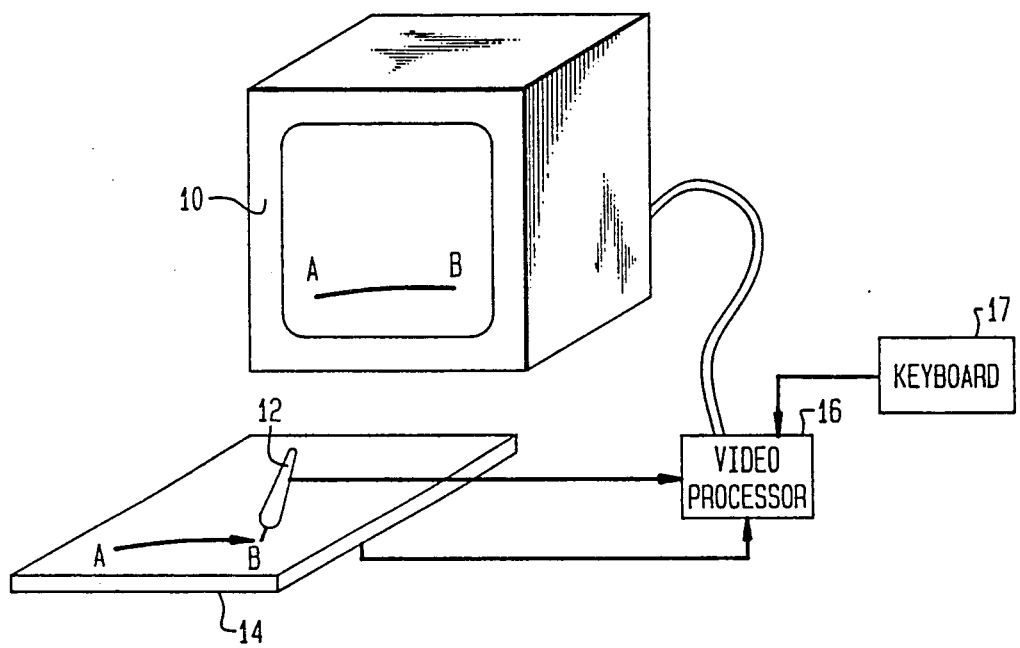
FIG. 1 is a partial perspective and partial block diagram illustrating a video graphics system of the type in which the present invention can be employed.

FIG. 1 illustrates a typical application in which the present invention might be employed. Referring to the figure, a graphic image is created on the screen of a video monitor 10 with the use of a pen or stylus 12 and a corresponding digitizing tablet 14. The pen and tablet provide input signals to a video processor circuit 16 which generates appropriate video signals to control the display on the screen of the monitor 10. Although illustrated as being a discrete structure separate from the monitor, the video processor circuit 16 could be incorporated within the housing for the monitor. In accordance with control signals from a keyboard 17 or other suitable input devices, the video processor causes images to be generated on the screen at locations corresponding to the relative position of the pen 12 on the tablet 14.

In accordance with the present invention, an airbrush spray pattern and other non-uniform patterns are created in a video image by means of a two step process. As a first step, multiple source patterns, or raster masks, are generated. Each source pattern comprises an array of numerical values which define a simulated airbrush spray pattern at an instant in time. During the second step in the creation of a graphic image, different source patterns are sequentially incorporated into the image to create a displayed pattern. Basically, each numerical value in the source pattern array defines one or more characteristics of an associated pixel in the displayed pattern. For example, in a relatively simple implementation of the invention, the values in the array can be binary ones and zeros to respectively determine whether associated pixels are to be on or off. The source patterns can be generated in real time as the video image is being created, or they can be previously generated and stored for subsequent retrieval as the image is created.

Figure 2:
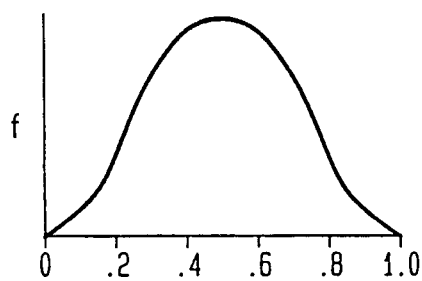
FIG. 2 is a graph of a Gaussian distribution function.

The source patterns can be generated in a variety of manners. In the following example of an embodiment of the invention, it is assumed that the source patterns each comprise an N by N array, where N could be 64. To create the source pattern, a random number table having multiple addressable locations, e.g., 64 memory locations, is generated. The various locations in the table are filled with randomly generated numbers having a histogram related to a desired distribution function. Preferably, the numbers range between zero and one. Thus, if the distribution function is a gaussian normal distribution, the value 0.5 should appear most frequently in the table whereas the values zero and one might appear only a few times or not at all, as shown in FIG. 2.

Figure 3:
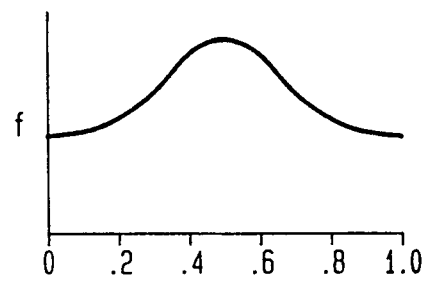
FIG. 3 is a graph of an elevated Gaussian distribution function.

A preferred distribution function for an airbrush spray pattern is an elevated gaussian function that is somewhat flattened, as shown in FIG. 3, so that the numbers at the extremes of the range have some probability greater than zero of appearing in the table, but not a probability as great as the numbers in the center of the range. To create particular desired effects, other distribution functions might be employed, for example a uniform distribution in which all numbers have an equal probability of appearing. The numbers in the random number table can even be generated by hand to achieve certain effects.

Once the random number table is created, it is addressed a number of times to produce multiple samples for the source array. Each sample $S_{(x,y)}$ can be a function of any one or more arguments. Examples of suitable arguments include x and y coordinate positions, color, the amount of paint to be applied and time. Thus, $S_{(x,y)} = F(x, y, \ldots)$ where F is designed for a particular source array.

These samples are stored in the source array and can be used to determine pixel values in the destination pattern. More particularly, the value P of a pixel at coordinate position x,y in the destination pattern is changed according to the relationship $P(x,y) = F'(S, x, _{color}, b_{color})$ where F' is an arbitrary function and S = the ON/OFF value stored in the source array at position x,y x = the alpha value stored in the source array at position x,y $_{color}$ = the color of a pixel at position x,y in the displayed pattern $b_{color}$ = the color stored at position x,y in the source array To illustrate the foregoing in greater detail, an example will be described in which the samples are used to select coordinate positions in the source array, and the selected positions determine the pixels in the destination pattern that are to be actuated. In this example, each sample is comprised of two values from the table. The first value is related to the x coordinate of a location in the source array, and the second value determines the y coordinate of the location. Referring to the functional block diagram of FIG. 4, as each value is retrieved from the table 20, it is multiplied by a scalar number in a multiplier 21. In the present case, the scalar is equal to N, i.e., 64, to define the coordinate value. Alternatively, if the numbers in the table range from 1 to 64, rather than 0 to 1, it would not be necessary to multiply them by the scalar to define the coordinate value. After two successive values are retrieved from the table and multiplied by the scalar (if appropriate) to produce a sample, a number is stored in the array 22 at a position having x and y coordinates respectively corresponding to the two values in the sample. For example, a binary one could be stored at the designated location in the array.

This process of obtaining a sample from the random number table 20 and storing a value in the array location defined by the sample is repeated a number of For example, NxN samples, i.e., 4096 samples, can be retrieved from the random number table. It will be appreciated that even though the total number of samples is equal to the total number of locations in the array 22, not every array location will have a binary one stored in it. Due to the distribution function and the randomness of the numbers stored in the table 20, certain coordinate positions may be duplicated a plurality of times during the sampling process whereas other coordinates may not be defined at all. Thus, the particular locations in the array which are identified by the binary ones will be random in accordance with the desired distribution function.

To illustrate, a 5×5 array containing 25 samples generated by a uniform distribution random number table is depicted in FIG. 5. As can be seen, only twelve of the locations in the array are designated by the samples.

The random number table 20 can be addressed in a sequential manner to obtain the successive values which determine the coordinates for the samples. Of course, any other type of addressing scheme, for example a random addressing arrangement, could be employed. Further, it is not necessary that the x and y coordinate values be obtained from the same table. Rather, separate random number tables could be established for each of these values.

When a sequential addressing scheme is employed, it will be appreciated that the resulting pattern could be repeated from one source array to the next if the number of addressable storage locations in the table is the same as, or a multiple of, N. To prevent such an occurrence, the starting address for the sequential addressing of the table is preferably varied according to a suitable functional basis, such as time.

With reference to FIG. 6, multiple source arrays, e.g., 50-100 arrays, can be produced in this manner and stored in a table 24 for subsequent generation of an airbrush spray pattern. When such a pattern is to be created in a video graphic image, the source arrays are individually retrieved from the table 24 and each controls the display of a corresponding pattern at a location defined by the pen. More particularly, each row of the source array corresponds to a raster scan line within the video image. The pixels in the corresponding scan lines of the image are actuated in accordance with the values stored in the source array. For example, if the source array contains a random arrangement of binary ones as depicted in FIG. 5, each pixel in the image which corresponds to the location of a binary one would be actuated to display a desired color, e.g., red. The other pixels in the image would remain unaffected. Thus, the random pattern defined by the source array is recreated in the video image.

If each source array is sufficiently large, it may not be necessary to store the entire array in the table 24. Rather, one-half or one-quarter of the array can be stored. When this portion of the array is retrieved from the table, it can be duplicated in a mirror image to recreate the entire array.

It may be desirable to process the values in the source array before reproducing it in the displayed pattern of the image. For example, by passing the array through a digital low pass or averaging filter 26, and using the filtered results to create the displayed pattern, a blurring effect can be obtained to reduce contrast within the spray pattern. Alternatively, if it is desirable to accentuate the differences within the pattern, the source array can undergo a high-pass filtering operation before generation of the displayed pattern.

As the pen is moved, or if it remains in the same position for a period of time, additional arrays are retrieved from the table 24 at a predetermined frequency under the control of a clocked address control circuit 28. Alternatively, a new array can be retrieved with each incremental change in the position of the pen. Each new array causes a corresponding pixel pattern to be generated on the display at the appropriate position determined by the location of the pen. By changing the source array in this fashion during the creation of the image, the displayed spray pattern varies with a randomness that is representative of the actual effects produced by an airbrush. Similar to the random number table, the source array table can be addressed sequentially or in a random manner. If addressed sequentially, the starting address is preferably varied, using any available functional basis, to avoid noticeable repetition in the displayed pattern.

As an alternative to generating a number of source arrays and storing them in a table, it may be feasible to generate each array in real time as the image is being created. The correspondence between the scan lines in the image and the rows of the array facilitates such an approach. Basically, as each sample is generated for the array the corresponding pixel in the image is actuated.

Due to the movement of the pen during the creation of the image, less than the total number of samples for each source array may be employed in the displayed pattern. In particular, as the pen is moved from one incremental position to the next, a new source array can be created. If the movement of the pen is sufficiently rapid, the generation of an array at a new position will begin before all of the samples of the prior pattern are incorporated into the previous position on the screen. In this event, the density of the spray pattern in the image will be reduced, to simulate the actual results that would appear when an airbrush is moved across a surface.

Conversely, if the pen remains in the same position for a period of time, multiple source arrays would be generated and produce multiple spray patterns at the same location on the display, to simulate the continued output of paint from the airbrush. Thus, the generation and display of the random samples in real time provides a realistic simulation of the results that are produced with an airbrush.

By varying certain parameters in the pattern generation process, other desired effects can be created. To change the apparent size of the spray the number of samples and the scalar multiplier can be varied. For example, by reducing N to 32 so that 32×32=1024 samples are obtained and each is multiplied by the scalar factor of 32, the effective size of the spray will be reduced to one-quarter of the area. Further, by reducing the number of samples but maintaining the scalar multiplier the same, the effective paint/air ratio, i.e., density, can be varied. These variations can be made in response to the manual actuation of triggers that are conventionally found on the pen 12.

The pattern generation technique of the present invention also enables other desired effects to be created. For example, by varying the source array on a less frequent basis during the creation of the displayed pattern, i.e., using the same array at multiple successive incremental positions of the pen, short random streaks can be created in the displayed pattern to simulate the appearance of chalk lines.

In a further embodiment of the invention, the number of samples needed to create a source array, and hence the time required to generate each array, can be reduced by employing an array row counter. Referring to FIG. 7, once an original source array has been generated in the manner described previously, the number of locations in each row of the array which contain a binary one are counted and stored in an N×1 count buffer 30. Subsequently, when it is desired to generate a raster mask, the count buffer 30 is sequentially addressed and the numbers stored therein determine how many pixels are to be obtained for each corresponding row of the mask. Thus, with reference to the 5×5 array illustrated in the example of FIG. 7, a value of one is stored in the first location of the buffer, a value of three in the second location, etc. When a raster mask is to be created, one x coordinate value would be obtained from the random number table 20 to determine the location of one pixel in the first scan line of the displayed pattern. Three x coordinate values would be obtained to determine the locations of three pixels in the next scan line, and so on. Accordingly, the number of samples required to generate each raster mask is reduced from $N^2$ to the sum of the numbers stored in the count buffer.

To vary the density of the spray pattern, the numbers stored in the buffer can be multiplied by a factor corresponding to the desired increase or decrease in density, to thereby change the number of samples per row.

It is not necessary that the numbers in the count buffer 30 be determined with reference to a previously created source array. Rather, they could be generated in accordance with any desired distribution function, or by hand. Further, the numbers in the random number table 20 can have one distribution, e.g., uniform, and the numbers in the count buffer could have a different distribution, such as gaussian.

In the previously described embodiment of the invention, the random number samples in the source array determine the location of particular pixels within the image that are to be actuated to display a particular color. This embodiment is but one example of the manner in which the random values can be used to simulate an airbrush spray pattern or other desired effect. In practice, may different parameters of a video image can be varied in accordance with the values in a source array. For example, these values can be used to control the color of each pixel in the destination pattern, i.e., one pixel might be blue, the next one can be red, the next green, etc. Another parameter that can be controlled with values in the source array is the alpha value (transparency) of each pixel.

Furthermore, each displayed pattern can be a function of multiple parameters. For example, multiple value source arrays can be employed, in which one value in each cell of the array would determine the location of pixels to be actuated, a second value in that cell would designate the color for each actuated pixel, and a third value would indicate the alpha values for the actuated pixels. Alternatively, it is possible to write the source array additively into a spare alpha buffer. The values thus stored in the spare alpha buffer can be used to attenuate the density of the simulated airbrush pattern.

In summary, the present invention provides a technique for producing a realistic simulation of an airbrush and the creation of other desired effects having a random characteristic. This technique employs pattern source arrays that correspond to the scan lines of a video image. Thus, the incorporation of information from an array into the image is easily accomplished. Furthermore, the varying of source arrays as the image is being created contributes to the randomness of the resulting pattern, and hence the generation of a more natural image.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A method for generating a randomly varying pattern in a video graphic image, comprising the steps of:
    a) generating a source array of values which define a raster mask having at least one video display parameter which varies in a random manner within the area of the mask;
    b) varying said source array over time; and
    c) repetitively generating pixel display patterns in the video image in accordance with said varying source array to produce a displayed random pattern.

2. The method of claim 1 wherein said varying step is carried out by generating multiple source arrays that are different from one another, storing said multiple source arrays in a table, and individually retrieving said arrays from said table during said display generating step.

3. The method of claim 1 wherein said parameter is the locations of pixels within said displayed patterns that are actuated to produce a particular video effect.

4. The method of claim 3 wherein said particular video effect is the display of a predetermined color.

5. The method of claim 3 wherein said source array is generated by:
    a) creating a table comprising multiple address locations, each address location containing a value that is randomly generated in accordance with a desired distribution function;
    b) addressing said table a first time and determining a first coordinate value from the value stored in the addressed location;
    c) addressing said table a second time and determining a second coordinate value from the value stored at the addressed location;

d) storing a value in a location of the source array which has x and y coordinates respectively corresponding to said first and second coordinate values; and e) repeating steps b), c) and d) a predetermined number of times to thereby store values at random locations in said array.

6. The method of claim 5 wherein said coordinate values are each determined by multiplying the addressed values in said table by a scalar number.

7. The method of claim 6 wherein said array comprises N×N locations and said scalar number is N.

8. The method of claim 6 wherein said predetermined number of times in which said steps are repeated is equal to N×N and said scalar number is N.

9. The method of claim 8 further comprising the step of varying N to change the size of the simulated spray pattern.

10. The method of claim 6 further comprising the step of varying said predetermined number while maintaining said scalar number constant to thereby vary the density of the simulated spray pattern.

11. The method of claim 5 further comprising the steps of:

f) determining the number of locations in each row of said array which contain said values after said steps having been repeated said predetermined number of times;

g) storing the number for each row in a memory; and h) for each pixel pattern that is displayed in a video image, performing the steps of:
   i) retrieving a number stored in said memory;
   ii) addressing said table a number of times equal to the retrieved number to obtain the retrieved number of coordinate values;
   iii) actuating the pixels having positions defined by the coordinate values in a scan line of the image; and
   iv) repeating steps i), ii) and iii) for successive scan lines in the image.

12. The method of claim 1 wherein said parameter is the color of pixels within said raster 13. The method of claim 1 wherein said parameter is the alpha value of pixels within said raster mask.

14. The method of claim 1 wherein multiple source arrays are generated in real time during said display generating step.

15. The method of claim 1 further including the step of filtering the values in said source array prior to generating said pixel display pattern.

16. The method of claim 15 wherein said values are low pass filtered.

17. The method of claim 15 wherein said values are averaged.

18. A method for generating a raster mask to simulate a random airbrush spray pattern in a video graphic image, comprising the steps of:

a) creating a table comprising multiple address locations, each address location containing a value that is randomly generated in accordance with a predetermined distribution function;

b) creating a buffer having an address location associated with each row of pixels in said raster mask, each address location in said buffer storing a number indicative of a number of pixels in the corresponding row of the mask;

c) retrieving the number stored in said buffer at an address location associated with one row of the mask;

d) addressing said table a number of times equal to said retrieved number;

e) actuating pixels in said row of said mask having respective locations related to the values stored at addressed locations of said table; and f) repeating steps c), d) and e) for each row in said mask.

19. The method of claim 18 wherein the location of said actuated pixel is determined by multiplying the value stored in said table by a scalar number.

20. The method of claim 19 wherein the values in said table are in the range from zero to one and said scalar number is equal to the number of pixels in a row of the mask.

21. The method of claim 20 further including the steps of varying the number of rows in the mask and said scalar number to change the size of the simulated spray pattern.

22. The method of claim 19 further including the step of varying the numbers in said buffer while maintaining said scalar number constant to change the density of the simulated spray pattern.

23. A system for providing a video graphic display having a random variation of at least one video display parameter to simulate a non-uniform pattern, comprising:

means for generating an array of values which vary in a random manner within the array, said values being related to at least one parameter of a video image;

means for controlling pixels in said image in accordance with the values in said array to produce displayed patterns;

means for determining the locations of the displayed patterns within the video image; and means for continually varying said array as said displayed patterns are being produced so that said patterns differ from one another to produce a randomly varying image.

24. The system of claim 23 wherein said generating means includes at least one table containing randomly generated numbers.

25. The system of claim 24 wherein said table of randomly generated numbers has a histogram related to a desired distribution function for the cross-sectional density of the pattern.

26. The system of claim 24 wherein said generating means further includes a buffer containing a number associated with each row of pixels in a displayed pattern, and means for addressing said table a number of times corresponding to a number stored in said buffer to generate that number of values for a row in the pattern.

27. The system of claim 23 wherein said location determining means comprises a pen and a digitizing tablet.

28. The system of claim 27 wherein said pen includes a trigger, and said system further includes means for varying the size of said pattern and the number of coordinate values which are generated for the pattern in response to actuation of said trigger.

29. The system of claim 27 wherein said pen includes a trigger, and said system further includes means for varying the number of coordinate values which are generated for a pattern in response to actuation of said trigger.

30. The system of claim 23 further including a table storing multiple arrays generated by said generating means, and means for addressing said table to retrieve said arrays individually during display of said patterns.

31. The system of claim 23 further including a digital filter for modifying the values in said array prior to display of said patterns.

32. A method for producing a video image having a parameter which varies in a random manner to simulate a non-uniform pattern, comprising the steps of:
   a) defining a source array having individual cells which correspond to respective pixels within a portion of the area of the image;
   b) selecting individual cells within said array whose locations are randomly determined to thereby provide a random arrangement of cells;
   c) determining a value for said parameter in each of the selected cells;
   d) controlling the pixels in said image which correspond to the selected cells in accordance with the parameter value determined for the respective cells;
   e) defining anew source array having a different random arrangement of selected cells;
   f) assigning a parameter value to each of the selected cells in said new source array;
   g) controlling pixels in said image which correspond to respective selected cells in said new source array in accordance with the parameter value assigned to the selected cells of said new source array; and
   h) continually repeating steps e-g until a video image having a desired pattern is generated.

33. The method of claim 32 wherein the cells in each new source array correspond to a different portion of the area of the generated video image than the cells of the previous array.

34. The method of claim 32 further including the step of storing each of said source arrays in a memory, and wherein said controlling steps are carried out by sequentially retrieving the stored arrays and controlling the pixels in a corresponding respective portion of the image as each array is retrieved.

35. The method of claim 32 wherein said parameter is the display of a predetermined color for a pixel and said values indicate whether said color is to be displayed at the corresponding pixels.

36. The method of claim 32 wherein a predetermined number of cells is selected for each array, and further including the steps of manually generating a signal to vary a characteristic of said pattern, and changing said predetermined number in response toe generation of said signal.

37. The method of claim 36 wherein said characteristic is the size of the pattern.

38. The method of claim 36 wherein said characteristic is the density of a color in said pattern.

* * * * *